US006220478B1

(12) United States Patent
Ingerson et al.

(10) Patent No.: US 6,220,478 B1
(45) Date of Patent: *Apr. 24, 2001

(54) TRUNK LOCK APPARATUS

(76) Inventors: Sidney D. Ingerson, P.O. Box 248, Kenmare, ND (US) 58746; Jerol H. Staael, Rt. 1, Box 52, Stanley, ND (US) 58784

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/211,320

(22) Filed: Dec. 14, 1998

(51) Int. Cl.[7] .............................. B60R 9/00; B65D 43/16; B65D 45/16

(52) U.S. Cl. ........................... 220/831; 220/326; 224/404

(58) Field of Search ..................................... 220/831, 315, 220/326, 324, 833, 835, 210, 1.5, 244, 314, 810, 830, 829, FOR 192, FOR 193; 292/229, 196, 219, 223; 224/404, 402, 403, 488, 315

(56) References Cited

U.S. PATENT DOCUMENTS 2,655,027 * 10/1953 Lynxwiler ........................ 292/229 X
4,127,016 * 11/1978 Ibsen .................................... 292/196
4,182,530 * 1/1980 Hodge .............................. 220/908 X
4,413,849 * 11/1983 Davis et al. ......................... 292/229
4,548,435 * 10/1985 Bourne ................................. 292/229
4,960,297 * 10/1990 Bouse et al. ......................... 292/223
5,118,000 * 6/1992 Howell et al. ................... 220/908 X
5,570,915 * 11/1996 Asadurian ........................ 292/223 X
5,875,948 * 3/1999 Sadler .............................. 220/326 X
5,931,033 * 8/1999 Lanigan et al. .................. 292/196 X
5,967,392 * 10/1999 Niemi et al. ......................... 224/404

* cited by examiner

*Primary Examiner*—Allan N. Shoap
*Assistant Examiner*—Niki M. Eloshway
(74) *Attorney, Agent, or Firm*—Robert E. Kleve

(57) ABSTRACT

The invention comprises trunk lock apparatus for locking a trunk having a rectangular bottom with upright front and rear and side panels, with a rectangular lid pivotally mounted at its rear edge to the top of the rear panel of the receptacle bottom of the trunk. The trunk lock apparatus has a horizontal latch panel pivotally mounted to the front panel of the receptacle near the top of the front panel which is pivotally mounted its top edge to pivot in an arc about its bottom edge forward toward the front panel and rearward away from the front panel with spring means urging the latch panel rearward. The lid has a downward projecting flange mounted to the underside of its forward edge and projecting downward therefrom with a forward projecting lip portion at the bottom of the flange. The lid is adapted to be pivoted downward onto the top of the receptacle with the forward projecting lip horizontally adjacent the rear of the horizontal latch panel when the lid is closed flush on the top of the receptacle so that when flush the spring means will urge the horizontal latch panel rearward over the top of the horizontal lip of the lid and thereby lock the lid in its closed position by preventing the lid from being pivoted upward and away from the receptacle of the trunk.

3 Claims, 3 Drawing Sheets

TRUNK LOCK APPARATUS

This invention relates to trunk locks, more particularly, the invention relates to trunk locks having securing means locking the lid of the trunk to the trunk receptacle.

It is another object of the invention to provide a novel trunk lock which has a latching means between the lid and receptacle of the trunk which is not easily accessible to tampering and forced opening of the lid.

It is an object of the invention to provide a novel trunk latch and locking mechanism which locks the lid of the trunk to the receptacle portion of the trunk and which with lid latch and receptacle cooperating latch extend along the front inside of the receptacle below the lid and which the trunk latch swing into engagement with the lid latch inside the receptacle and rearward of the front panel of the receptacle with a cover handle covering the front edge of the cover and box making it not readily accessible to being opened from outside the trunk by such things as prying the lid open from the front, other than by the key lock to unlatch or open the lid of the trunk.

Further objects and advantages of the invention will become apparent as the description proceeds and when taken in conjunction with the accompanying drawings wherein:

BRIEF DESCRIPTION OF THE PREFERRED EMBODIMENT

Figure 1:
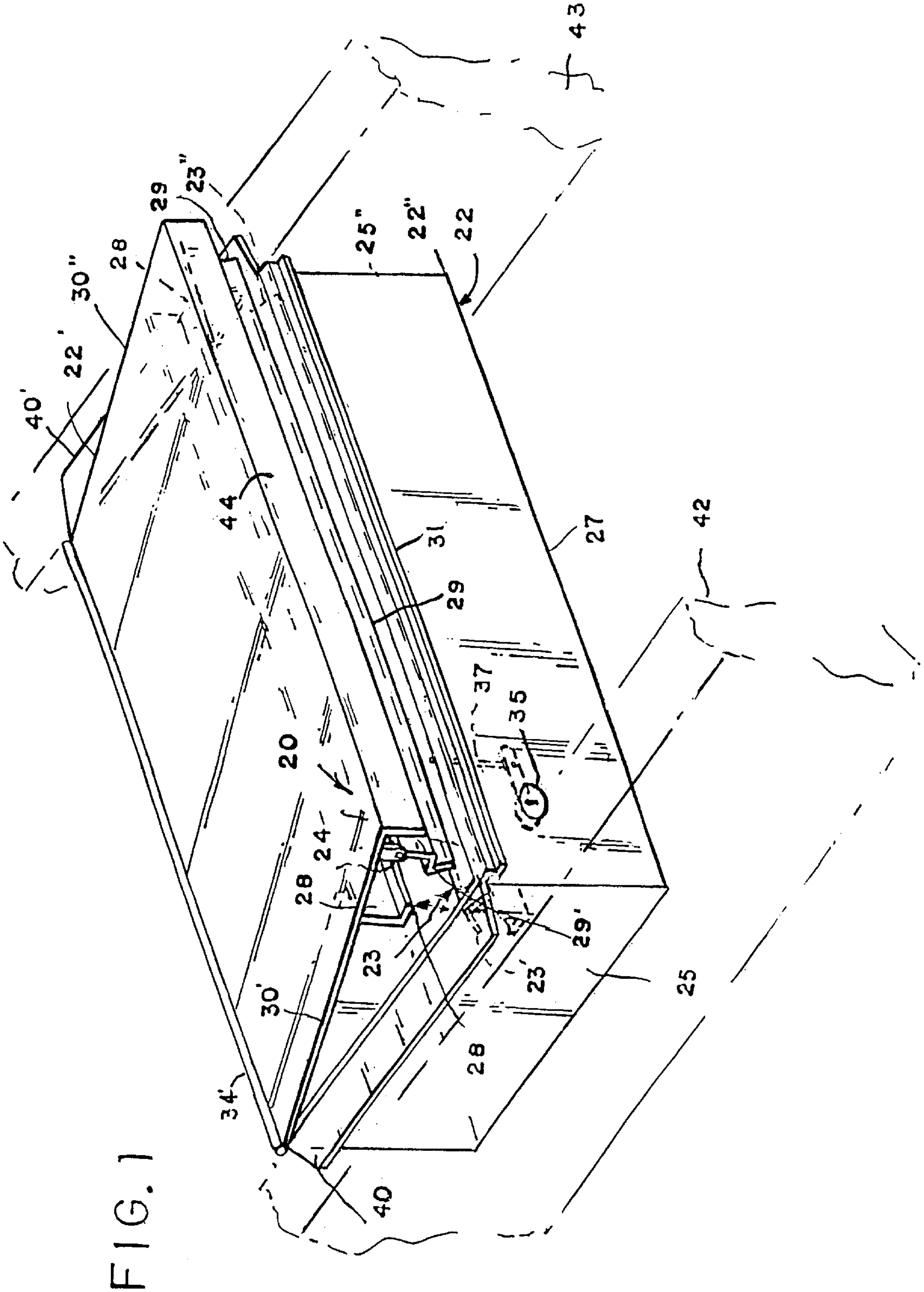
FIG. 1 is a perspective view of the trunk latch apparatus shown installed in a trunk.
Figure 2:
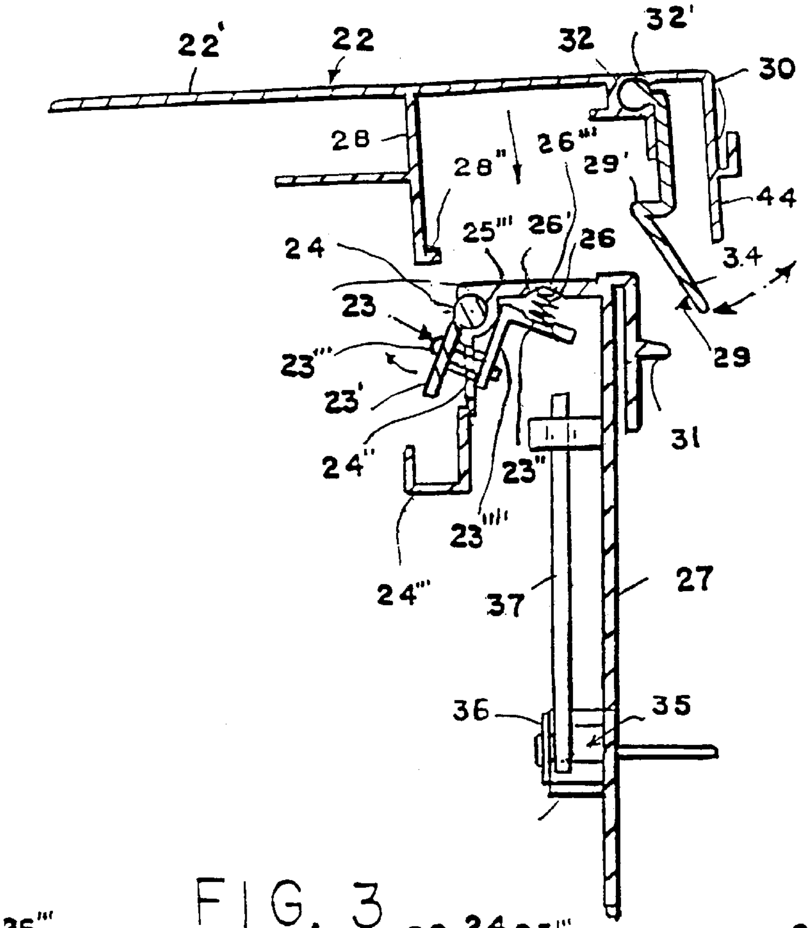
FIG. 2 is a fragmentary cross sectional side view of trunk latch apparatus shown installed in a trunk with the lid open.

Briefly stated, the invention comprises a trunk lock apparatus having trunk receptacle and a trunk lid with the lid pivotally mounted to the receptacle at the rear wall of the receptacle and the rear edge of the lid with the lock apparatus to lock the lid forward edge to the forward wall of the receptacle with the receptacle having a pivotal locking plate inside the front wall of the trunk and spaced rearward of the front wall and with the lid having a cooperating lock plate fixed to the underside of the lid and extending downward from a location on the lid spaced rearward from the forward edge of the lid and forward wall of the receptacle to make the locking apparatus less accessible to tampering Referring more particularly to the drawings, in FIGS. 1, 2,3 and 4 the trunk latch apparatus 20 is shown installed in a trunk 22 in the lid 22' and the receptacle portion 22" of the trunk. The latch apparatus 20 has a elongated pivotally mounted receptacle latch plate 23 which is pivotally mounted in the receptacle portion 22" of the trunk and which extends in length along the front of the receptacle of the trunk with its one end plate portion 23' adjacent one side of the trunk and its other end plate portion 23" adjacent the other side of the trunk fixed together by a nut and bolt connection 23'" which extends through an opening 24" of the front panel portion 24'" of front panel 27 and is pivotally mounted at its cylindrical top edge 24 to an elongated cylindrical socket 24' which extends similarly along substantially the entire front panel 27 of the receptacle of the trunk from one side 25' of the trunk to the other side 25" of the trunk and which socket is fixed to the sides of the receptacle of the trunk. A compression spring 26 has one end 26' compressed against the horizontal top flange plate 25'" of the front wall 27 and the bottom end 26" compressed against the pivotal rear plate portion 23" of plate 23. A suitable recesses 26'" may be provided in the plate 25'" and the rear plate 23' to receive and keep the ends of the spring aligned. Also, the spring may have cone shape with the wide base in the recess in the plate 23' and the point of the cone spring in the recess in the upper plate portion 25'". The rear plate portion 23" is fixed to the front plate 23' by the bolt connection 23'" so that plate 23 and pivots as a single piece so that the spring 26 being compressed between the top flange 25" and the pivotal plate flange 23" urges and pivots the latch plate 23 clockwise downward into its angular position shown in solid lines in FIG. 2 and dashed lines in FIG. 3, about its top pivotal mounting 24 in the elongated socket 24' to the front panel 27 of the box or receptacle of the trunk.

The receptacle 22' has front and rear walls 27 and 27', respectively, and side walls 25 and 25', with a bottom wall fixed together to form the receptacle. downward and has a forward extending lip 28" at its bottom edge. The flange and lip extend in length from adjacent one side 30' of the cover to the other side 30" of the cover The spring 26 urges the pivoting latch plate 23 of the receptacle portion rearward. The plate portion 23' of the plate 23 has its lowermost edge slightly above the lip 28" when the lid is closed so that the spring urges and swings the plate 23 over the top of the lip 28" of the lid, when the lid is closed as shown in FIG. 3 to lock the lid to the receptacle portion of the trunk.

Figure 3:
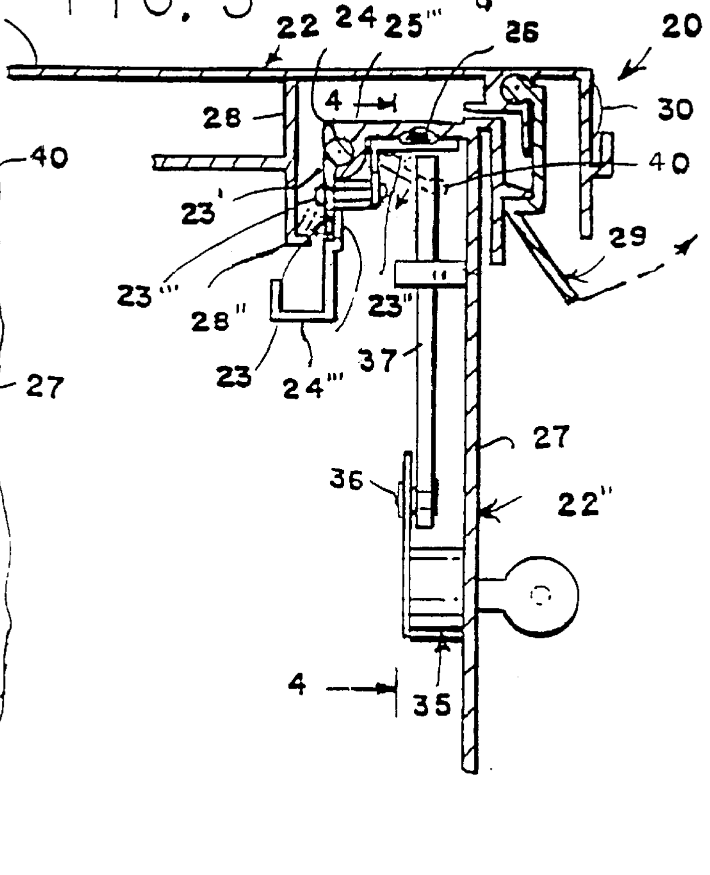
FIG. 3 is a fragmentary cross sectional side view of the trunk latch apparatus installed in a trunk with the lid closed.
Figure 5:
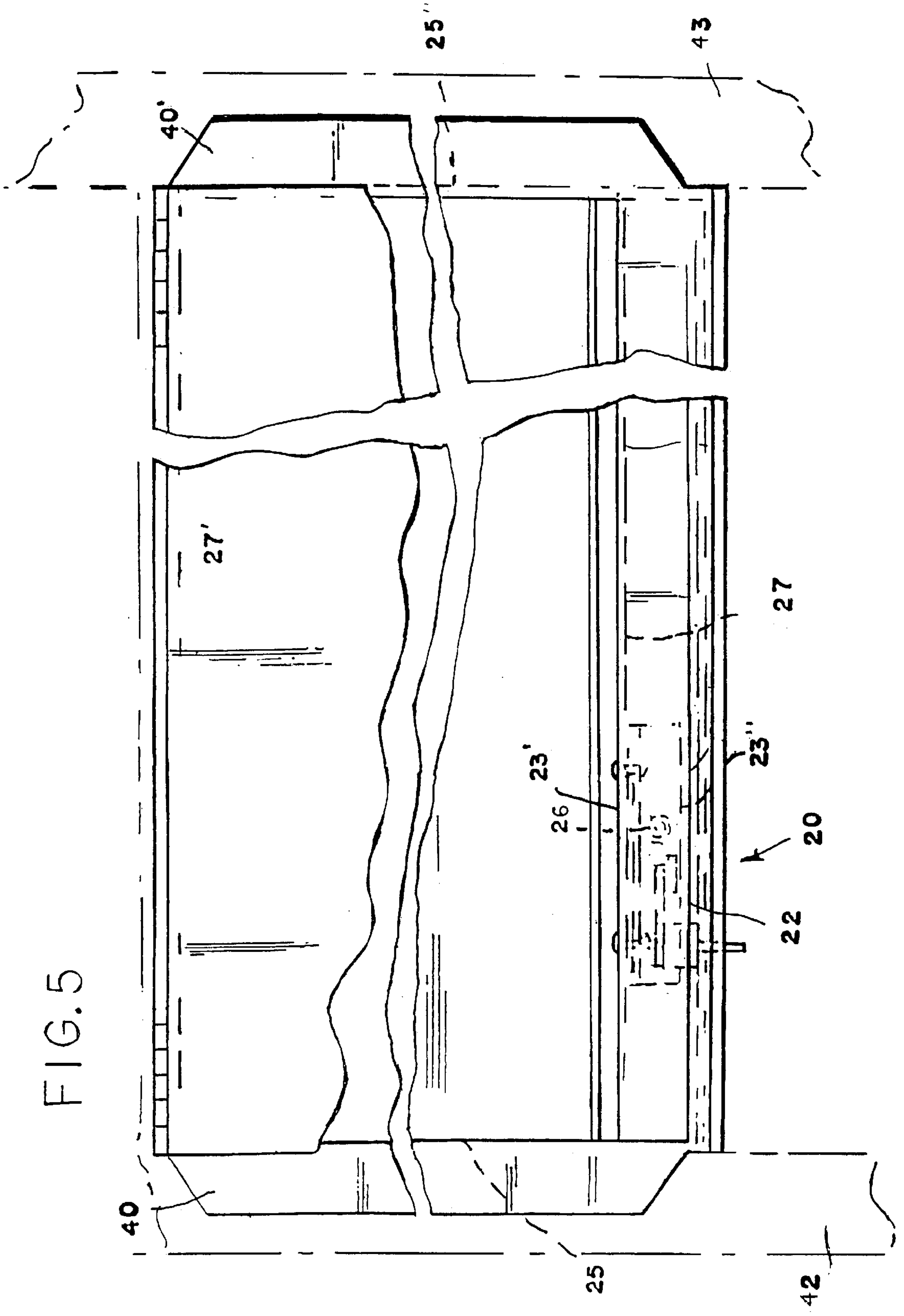
FIG. 5 is a top plan view of the trunk lock apparatus with the lid cutaway to reveal the latch key lock apparatus mounted in the receptacle of the trunk apparatus.

The lid 22' also has a pivoting latch plate or handle 29 which is spaced forward of the pivoting plate 23 and the lip at a location near the front of the lid which serves as a pivoting cover or lid handle and which is pivotally mounted to underside of the lid panel 22' and extends downward at a location spaced slightly rearward from the forward edge 30 of the lid and has a rearward projecting ledge 29' which can be pivoted under the elongated forward protective ledge 31 mounted to the front wall 27 of the receptacle to latch the lid to the receptacle portion, when the lid is closed as shown in FIG. 3 and which operates independently of the lock latch 23 and visa versa so that the lid latch 29 can latch the lid closed to the receptacle independently of the lock latch 23, and the lid latch 29 can lock the lid closed independently of the lid latch. The lid latch plate 29 has a cylindrical rod portion 32 at its upper edge which is pivotally mounted in a socket 32' of the lid to swing under the ledge 31 of the receptacle for the latching of the lid to the receptacle. The lid latch plate has a slanted outward and downward flange 34 at its bottom edge which extends downward and outward for the operator to grasp and pull or pivot the latch plate outward to unlatch the lid latch from the receptacle by swinging the plate 29 outward and forward away from the ledge 31 of the receptacle and thereby removing the lid latch from its engaged position so that the lid can be swung upward about its rear hinge mounting 34' to the trunk, unless locked by the lock plate.

Figure 4:
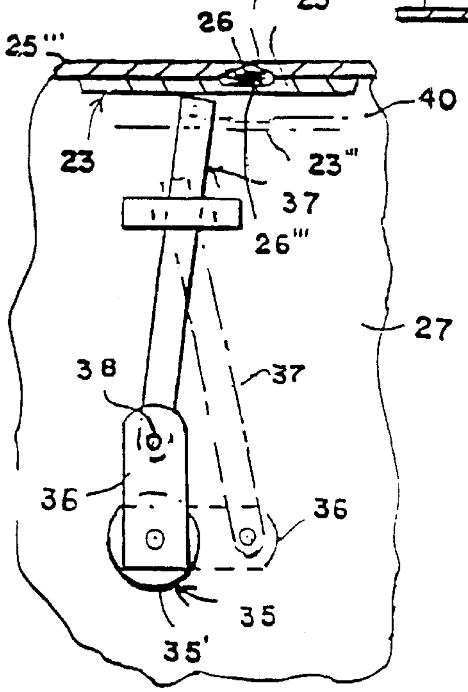
FIG. 4 is a cross sectional view taken along line 4—4 of FIG. 3.

The key lock 35 is mounted in the front panel 27 of the receptacle portion of the trunk and turning the key cylinder 35' with the correct key will pivot the short lug 36 counterclockwise when viewed from FIG. 4 upward which pushed the long rod 37, which has its lower end pivotally mounted to the short lug 36 at pin 38, upward and the pushing of the rod upward causes the upper end of the rod 37 to engage the lateral flange 23" of the lock plate 23 and pivot the lock plate 23 counterclockwise away from the lip of the lid to unlock the lid from the receptacle, so that the lid may pivot upward counter clockwise about its rear hinge mounting relative to the receptacle portion as shown in FIGS. 1 and 3, if the latch plate 29 is also manually held forward at the same time as already described.

The pivoting of the latch plate 23 upward, counterclockwise about its pivotal mounting 24 by the rod 37 being pushed upward by the turning of the key lock as described acts to compress the coil spring 26 putting the spring under compression so that when the rod 37 is lowered by the turning of the key lock in the opposite direction the coil spring 26 being released from its compressing position will push the latch plate 23 clockwise toward its position shown in dashed lines 40 in FIG. 3, so that when the lid 22' is lowered the lip 28" will downwardly engage against the projecting flange 23' of the plate 23 and push the plate 23 counterclockwise until the lip has traveled below the bottom of flange 23' whereupon the plate 23 will under spring compression pivot the plate clockwise back to place the flange above the lip and hold the lid in its downward position. The attempted raising of the lid when the flange is above the lip will only cause the flange to lock against the vertical panel portion 28 of the lid and prevent the flange from pivoting clockwise further thereby holding the lid closed. This action will lock the lid closed until the key lock is again used to engage the flange 23" of the pivot lock plate and push the flange 23" counterclockwise thereby push flange 23' of plate 23 counterclockwise out and away from the lip 23"freeing the lid so that it can now be pivoted open relative to the receptacle portion of the trunk. The lid 22' also has a fixed downward extending flange 44 at its forward most edge which extends downward from the lid in front of the receptacle front wall.

Thus, it will be seen that a novel latch apparatus has been provided for a trunk which make the latch plate in an largely inaccessible location from the outside of the trunk to make is less susceptible to someone tampering with the latch.

The trunk box has a pair horizontal flanges 40 and 40' fixed to the upper edges of the pair of side panels 25 and 25' of the receptacle portion of the box 22' which extend horizontally and perpendicularly outward from the upper side edge of the side panels 25 and 25' and are adapted to extend over the tops of the side panels of 42 and 43 of the rear of a pickup truck and be fixed to the truck by metal screws or bolts or other structure.

The length of the box is intended to be the width of the box at the front of the bed of the pickup truck as defined by the inside of the side panels of the truck so that the box will fit between the side panels with the side panels of the box in close proximity to the side panels of the pick up truck.

Thus, by having the key operated latching means 23 to hold the cover of the box to the receptacle portion of the box being placed rearward from the front panel and below the top front edge of the box, the latching structure is less accessible to direct access to tampering with, as occurs in those boxes wherein the latch may have an L shape that swings upward from the top front edge of the receptacle into a slot in the front bottom edge of the cover to latch the cover to the receptacle. In the invention described herein, the location of the latching plate 23 makes it difficult for an intruder to reach it, to cause it to release the cover.

Further, the pivoting latch plate 29 covers the front edge of the front wall of the receptacle as well as the fixed front flange 44 making prying of the front edge upward more difficult, and the latch plate 29 and cooperating front flange or ledge 44 by extending substantially the entire length of the box makes prying the lid open from forward side of the box more difficult. Further, even if the plate 29 is bypassed, by being destroyed when prying the lid open from the front; then, the plate 23' has pivoted onto the ledge and the prying of the lid upward only wedges the plate portion more securely on the ledge and since the plate and ledge run the full length of the box, it would be more difficult to gain access to the plate 23.

A pair of bolts having threaded ends extend through the front plate 23' and through the lateral extension plate 23"" of the rear plate 23" with spacers on the bolts to form the bolt connection 23"' to keep the plates 23' and the lateral extension plate portion 23"" of plate 23" in parallel fixed spaced relation to one another when nuts are threaded onto the bolts against the lateral extension plate portion 23"" of plate 23" while the head of the bolt is against the front plate 23'. The lateral extension 23"" is formed integrally with plate 23" to form an L shaped cross section. The cylindrical top edge 24 of plate portion 23' is pivotally mounted in socket 24' to provide the pivotal mounting for the plate 23', and the opening 24"' through a flange 24" extending down from the socket is sufficient so that the bolts and spacers may move freely through the flange and to enable the plate 23 including the front plate 23' and rear plate 23" to pivot to their two positions freely with only the spring 26 acting on them to urge them to their angular position as already described.

It will be obvious that various changes and departures may be made to the invention without departing from the spirit and scope thereof; and accordingly, it is not intended that the invention be limited to that specifically described in the specification or as illustrated in the drawings but only as set forth in the appended claims wherein:

What is claimed is:

1. A trunk lock apparatus comprising a trunk receptacle, a lid, and a trunk lock apparatus, said receptacle having a bottom with forward and rearward upright panels and lateral opposing upright panels and an open top, said lock apparatus comprising an elongated locking flange having a top pivotally mounted to said receptacle adjacent to said forward panel along an axis extending through the lateral panels and depending downward from its pivotal mounting, said elongated locking flange being elongated parallel to said axis, spring means urging said depending locking flange rearward about its pivot, said lid having a forward and rearward edge with its rearward edge pivotally mounted to the rear panel of the receptacle to close over the open top of the receptacle, said lid having a depending flange fixed adjacent to its forward edge and depending downward with a forward projecting lip with said lip elongated parallel with the elongated locking flange, said lip being adjacent said locking flange when said lid is closed over the top of the receptacle, whereby when said lid is closed horizontally over the top of the receptacle, and said spring may urge the elongated locking flange to pivot laterally rearward over the top of the elongated lip of the lid to lock the lid to the receptacle, said locking flange and said lip of said depending flange both being elongated to extend a significant distance along a path longitudinally from said one lateral panel toward the other lateral panel.

2. A trunk lock apparatus comprising a trunk receptacle, a lid, a trunk lock apparatus, said receptacle having a bottom with forward and rearward upright panels and lateral opposing upright panels and an open top, said lock apparatus comprising locking flange means pivotally mounted to the receptacle adjacent to said forward panel to pivot about an axis extending from one lateral panel to the opposing lateral panel and elongated parallel to said pivotal axis, a spring urging said locking flange pivotally rearward, said lid having a forward and rearward edge, said lid being closable over the open top of said receptacle, said lid having a dependent flange fixed adjacent to its forward edge and projecting downward with a forward projecting lip, said lip being elongated parallel to said pivotal axis of said locking plate with said locking flange being forward of said lip when said lid is closed over the top of the receptacle, whereby when the lid is closed horizontal over the top of the receptacle, the spring may urge the locking flange to pivot on its pivotal mounting rearward over the lip of the lid to lock the lid to the receptacle, said locking flange and said lip of the depending flange both being elongated parallel to said axis with their surfaces extending laterally a significantly greater distance than their front to rear width surfaces to provide a relatively broad lateral locking engaging surfaces for the apparatus.

3. A trunk lock apparatus comprising a trunk receptacle, a lid, a trunk lock apparatus, said receptacle having a bottom with opposed longitudinal extending upright panels and opposed lateral extending upright panels, and an open top;

said lock apparatus comprising elongated locking flange means movably mounted to move lateral and adjacent one of said longitudinal panels and elongated parallel to said longitudinal panel, said lid having opposed longitudinal extending edges, said lid being closable over the top of the receptacle, said lid having a dependent flange adjacent one longitudinal edge of said lid and projecting downward with a lateral projecting lip, said lip being elongated parallel to said longitudinal panel and locking flange and laterally adjacent said locking flange when said lid is closed over the top of said receptacle, spring means urging said locking flange laterally toward said lip when the lid is closed over the top of the receptacle, whereby when the lid is closed horizontal over the open top of the receptacle said spring will urge said locking flange over the top of the lip to lock the lid to the receptacle, said locking flange and lip being elongated longitudinally a significantly greater distance than laterally to provide a relatively broad longitudinal locking engaging surfaces for the apparatus.

* * * * *